United States Patent
Miao et al.

(10) Patent No.: US 10,437,942 B2
(45) Date of Patent: Oct. 8, 2019

(54) KALMAN FILTER BASED CAPACITY FORECASTING METHOD, SYSTEM AND COMPUTER EQUIPMENT

(71) Applicant: Baidu Online Network Technology (Beijing) Co., Ltd., Beijing (CN)

(72) Inventors: Beibei Miao, Beijing (CN); Yu Chen, Beijing (CN); Xuebo Jin, Beijing (CN); Xianping Qu, Beijing (CN); Shimin Tao, Beijing (CN); Zhi Zang, Beijing (CN); Bo Wang, Beijing (CN)

(73) Assignee: Baidu Online Network Technology (Beijing) Co. Ltd., Beijing (CN)

( * ) Notice: Subject to any disclaimer, the term of this patent is extended or adjusted under 35 U.S.C. 154(b) by 0 days.

(21) Appl. No.: 15/033,604

(22) PCT Filed: Sep. 7, 2015

(86) PCT No.: PCT/CN2015/089025
§ 371 (c)(1),
(2) Date: Apr. 29, 2016

(87) PCT Pub. No.: WO2016/155241
PCT Pub. Date: Oct. 6, 2016

(65) Prior Publication Data
US 2018/0196891 A1    Jul. 12, 2018

(30) Foreign Application Priority Data

Apr. 3, 2015  (CN) .......................... 2015 1 01586999

(51) Int. Cl.
*G06F 17/16*     (2006.01)
*G06F 17/18*     (2006.01)
(Continued)

(52) U.S. Cl.
CPC .......... *G06F 17/5009* (2013.01); *G06F 16/23* (2019.01); *G06F 17/16* (2013.01);
(Continued)

(58) Field of Classification Search
CPC ...... G06F 17/5009; G06F 17/16; G06F 17/18; G06F 19/00; G06F 2217/16; H03H 17/0257
(Continued)

(56) References Cited

U.S. PATENT DOCUMENTS 6,993,458 B1 *  1/2006  Castelli ................. G06F 11/008
                                                        370/516
8,751,463 B1 *  6/2014  Chamness ......... G06F 17/30153
                                                        707/693
(Continued)

FOREIGN PATENT DOCUMENTS

CN    102608631 A    7/2012
CN    103399496 A    11/2013
(Continued)

OTHER PUBLICATIONS

VPS Naidu, Jan. 7-10, 2008, 46th AIAA Aerospace Sciences Meeting and Exhibit, "Evaluatioin of Acceleration and Jerk Models in Radar and IRST Data Fusion for Tracking Evasive Maneuvering Target" ("Naidu") (Year: 2008).*
(Continued)

*Primary Examiner* — Aniss Chad
*Assistant Examiner* — Faraj Ayoub
(74) *Attorney, Agent, or Firm* — Knobbe Martens Olson & Bear LLP

(57) ABSTRACT

In one embodiment, a Kalman filter based capacity forecasting method includes acquiring a capacity time sequence of an object to be forecasted; establishing a dynamical model for the capacity time sequence, and extracting a state
(Continued)

transition parameter and a process noise parameter of the dynamical model; performing Kalman filter estimation on the capacity time sequence by using the state transition parameter and the process noise parameter to generate at least one state characteristic signal; segmenting the capacity time sequence according to the at least one state characteristic signal, and determining at least one corresponding segmentation point; and forecasting the capacity at future time according to the at least one segmentation point determined in the capacity time sequence. By adopting the technical solutions of the invention, accurate forecasting of the capacity growth is achieved, to facilitate operation and maintenance personnel making a reasonable capacity expansion plan.

17 Claims, 9 Drawing Sheets

(51) Int. Cl.
　　*H03H 17/02*　　(2006.01)
　　*G06F 16/23*　　(2019.01)
　　*G06F 17/50*　　(2006.01)
　　*G06F 19/00*　　(2018.01)

(52) U.S. Cl.
　　CPC .............. *G06F 17/18* (2013.01); *G06F 19/00* (2013.01); *H03H 17/0257* (2013.01); *G06F 2217/16* (2013.01)

(58) Field of Classification Search
　　USPC .............................................................. 703/2
　　See application file for complete search history.

(56) References Cited

U.S. PATENT DOCUMENTS

| | | | |
|---|---|---|---|
| 9,047,574 B2* | 6/2015 | Villeneuve | ........ G06F 17/30398 |
| 9,261,863 B2 | 2/2016 | Sloop et al. | |
| 9,471,082 B2 | 10/2016 | Sloop et al. | |
| 2009/0228225 A1 | 9/2009 | Burgess | |
| 2009/0306915 A1 | 12/2009 | Schoch | |
| 2013/0190940 A1 | 7/2013 | Sloop et al. | |
| 2014/0289004 A1* | 9/2014 | Monforte | ........... G06Q 30/0202 |
| | | | 705/7.31 |
| 2016/0154417 A1 | 6/2016 | Sloop et al. | |

FOREIGN PATENT DOCUMENTS

| | | |
|---|---|---|
| EP | 2098878 | 9/2009 |
| KR | 101271694 B1 | 6/2013 |
| KR | 101430258 B1 | 8/2014 |
| KR | 20140147456 A | 12/2014 |
| KR | 20140148370 A | 12/2014 |
| WO | 2011019979 A2 | 2/2011 |

OTHER PUBLICATIONS

Joo et al., "Performance Analysis of the Tracking Filter Employing Jerk Model for Highly Maneuvering Targets", The Journal of Korea Navigation Institute, 2000, vol. 4, pp. 50-66.

* cited by examiner

KALMAN FILTER BASED CAPACITY FORECASTING METHOD, SYSTEM AND COMPUTER EQUIPMENT

CROSS REFERENCE TO RELATED APPLICATIONS

The present application is the U.S. National Phase Application under 35 U.S.C. § 371 of International Application No. PCT/CN2015/089025 filed Sep. 7, 2015, which claims the priority of Chinese patent application No. 201510158699.9, on Apr. 3, 2015. Each of these prior applications is hereby incorporated by reference in its entirety.

TECHNICAL FIELD

The present invention relates to the technical field of communications, and particularly relates to a Kalman filter based capacity forecasting method, system and computer equipment.

BACKGROUND

A large volume of information data is generated with the rapid development of Internet and information industry. Operation and maintenance personnel need to purchase storage devices in time for effectively storing the ever increasing data. However, due to inaccurate purchase budget, equipment is often left unused as a result of excessive purchase, and manpower waste and financial loss are brought to companies and enterprises. Therefore, those skilled in the art actively pursue data analysis and data visualization research projects, to analyze the basic change trend through historical data in a capacity time sequence, in order to accurately forecast the future capacity trend, achieve the goal of intelligently customizing a purchase plan, reduce the purchase cost for a company and avoid wastes.

In the prior art, the methods for forecasting the future capacity trend through the historical data in the capacity time sequence have the following shortcomings: (1) with regard to the human observation method, although the professionals with substantial experience can relatively accurately judge the trend of the capacity time sequence data, the forecasting error is still relatively excessive; and (2) the threshold alarm method can remind relevant operation and maintenance personnel in time of purchasing, but cannot give a reasonable suggestion for the purchase amount, thus easily leading to excessive capacity expansion and waste.

SUMMARY

An embodiment of the present invention provides a Kalman filter based capacity forecasting method, system and computer equipment, for accurately forecasting capacity increase and then facilitating operation and maintenance personnel making a reasonable capacity expansion plan.

In order to achieve the above object, the embodiments of the present invention provide a Kalman filter based capacity forecasting method, including:
acquiring a capacity time sequence of an object to be forecasted;
establishing a dynamical model for the capacity time sequence, and extracting a state transition parameter and a process noise parameter of the dynamical model;
performing a Kalman filter estimation on the capacity time sequence by using the state transition parameter and the process noise parameter to generate at least one state characteristic signal;
segmenting the capacity time sequence according to the at least one state characteristic signal, and determining at least one corresponding segmentation point; and
forecasting the capacity at future time according to the at least one segmentation point determined in the capacity time sequence.

An embodiment of the present invention further provides a Kalman filter based capacity forecasting system, including:
an acquisition module, used for acquiring a capacity time sequence of an object to be forecasted;
an establishment and extraction module, used for establishing a dynamical model for the capacity time sequence, and extracting a state transition parameter and a process noise parameter of the dynamical model;
an estimation generating module, used for performing a Kalman filter estimation on the capacity time sequence by using the state transition parameter and the process noise parameter to generate at least one state characteristic signal;
a segmenting module, used for segmenting the capacity time sequence according to the at least one state characteristic signal, and determining at least one corresponding segmentation point; and
a forecasting module, used for forecasting the capacity at future time according to the at least one segmentation point determined in the capacity time sequence.

An embodiment of the present invention provides a computer equipment, including: one or more processors; a memory; and one or more programs, which are stored in the memory and configured so that the one or more processors execute instructions contained in the one or more programs for executing a Kalman filter based capacity forecasting method comprising: acquiring a capacity time sequence of an object to be forecasted; establishing a dynamical model for the capacity time sequence, and extracting a state transition parameter and a process noise parameter of the dynamical model; performing a Kalman filter estimation on the capacity time sequence by using the state transition parameter and the process noise parameter to generate at least one state characteristic signal; segmenting the capacity time sequence according to the at least one state characteristic signal, and determining at least one corresponding segmentation point; and forecasting the capacity at future time according to the at least one segmentation point determined in the capacity time sequence.

According to the Kalman filter based capacity forecasting method, system and the computer equipment provided by the embodiments of the present invention, a dynamical model is established for the acquired capacity time sequence, then filter estimation is performed on the capacity time sequence under the dynamical model by using the Kalman filter to generate at least one state characteristic signal, the generated state characteristic signals are segmented, and the capacity at future time is forecasted according to the segmentation points, so that the forecasting accuracy is improved.

DETAILED DESCRIPTION OF THE EMBODIMENTS

In the technical solutions provided by the present invention, a capacity time sequence is filtered based on a Kalman filter to generate state characteristic signals; the state characteristic signals are segmented to determine segmentation points and the growth trend of the signals in each segment, and then the capacity at future time is forecasted by using the determined segmentation points. The technical solutions provided by the embodiments of the present invention can be applied to various Kalman filter based capacity forecasting systems.

Embodiment I

Figure 1:
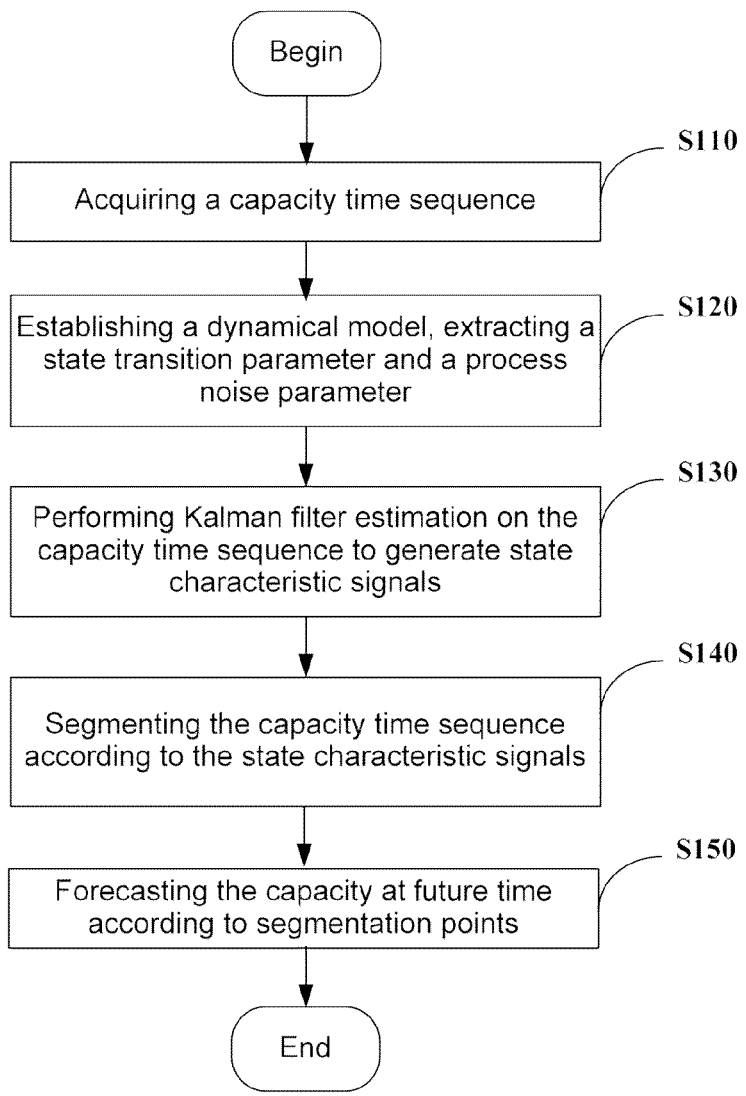
FIG. 1 is a method flowchart of an embodiment of a Kalman filter based capacity forecasting method provided by the present invention.

FIG. 1 is a method flow chart of an embodiment of a Kalman filter based capacity forecasting method provided by the present invention.

With reference to FIG. 1, a capacity time sequence of an object to be forecasted is acquired at step S110.

The object to be forecasted may be ever-increasing information data in the information industry or Internet. A sequence formed by information capacity changed over time is generally referred to as the capacity time sequence. Each time point in the capacity time sequence corresponds to the capacity value of an information capacity. The above capacity time sequence can be formed by acquiring on line or off line the historical capacity data of the object to be forecasted.

At step S120, a dynamical model is established for the capacity time sequence, and a state transition parameter and a process noise parameter of the dynamical model are extracted.

The study on the dynamical model of a mobile object has a long history and achieved good result. At present, the dynamical models which have achieved good effects and been widely used mainly include a constant velocity (CV) model, a constant acceleration (CA) model, a Singer model, a current statistical model, a Jerk model, etc. Various dynamical models of mobile objects in different forms are formed by supposing that high-order state characteristic signals of target velocity and acceleration satisfy different statistical properties, and involve a mathematic relation. The higher the consistency between the selected dynamical model and the actual target moving state characteristic is, the better the tracking performance obtained by estimating a target state with the dynamical model is (namely, the smaller the global variance is).

In this embodiment, the existing study on the dynamical model is applied to the analysis on the growth trend of the above capacity time sequence, thus establishing the dynamical model for the capacity time sequence.

To establish the dynamical model of the capacity time sequence, for example, it is supposed that the ideal acceleration value of linear signals is 0, then a CA model can be established to estimate the velocity; the ideal acceleration of nonlinear signals of a quadratic function is not 0, but the derivative of the acceleration is 0, then a Jerk model can be established to estimate the acceleration; and a trigonometric function trend model can be established for periodic signals. Based on such a thought, the corresponding dynamical model can be established through arithmetical operation according to the change of the capacity time sequence.

Two parameters for describing the target state characteristics, i.e., a state transition parameter and a process noise parameter corresponding to the transition from the current state to the next state of a target, are generally present in a fixed dynamical model. For example, the corresponding system state equation of the Jerk model can be expressed as:

$$X(k)=AX(k-1)+BU(k)+W(k) \quad (1)$$

where X(k) is a system state quantity when the system is in the $k^{th}$ state, U(k) is a control quantity in the $k^{th}$ state, and A is the corresponding state transition matrix of the system state equation, that is, the above state transition parameter. A is expressed as follows:

$$A = \begin{bmatrix} 0 & T_0 & \frac{T_0^2}{2} & p_1 \\ 0 & 1 & T_0 & q_1 \\ 0 & 0 & 1 & r_1 \\ 0 & 0 & 0 & s_1 \end{bmatrix} \quad (2)$$

W(k) is the corresponding process noise item of the system state equation, its corresponding process noise variance matrix Q may be the process noise parameter under the Jerk model, and Q is expressed as follows:

$$Q = 2\alpha\sigma_j^2 \begin{bmatrix} q_{11} & q_{12} & q_{13} & q_{14} \\ q_{21} & q_{22} & q_{23} & q_{24} \\ q_{31} & q_{32} & q_{33} & q_{34} \\ q_{41} & q_{42} & q_{43} & q_{44} \end{bmatrix} \quad (3)$$

where $T_0$ is a sampling time interval, a is a maneuvering frequency, and $\sigma_j^2$ is an instantaneous variance of the Jerk model;

$$\begin{cases} p_1 = \dfrac{2 - 2\alpha T_0 + \alpha^2 T_0^2 - 2e^{-\alpha T_0}}{2\alpha^3} \\ q_1 = \dfrac{e^{-\alpha T_0} - 1 + 2\alpha T_0}{\alpha^2} \\ r_1 = \dfrac{1 - e^{-\alpha T_0}}{\alpha} \\ s_1 = e^{-\alpha T_0} \end{cases} \quad (4)$$

$$\begin{cases} q_{11} = \dfrac{1}{2\alpha^7}\left[\dfrac{\alpha^5 T_0^5}{10} - \dfrac{\alpha^4 T_0^4}{2} + \dfrac{4\alpha^3 T_0^3}{3} - 2\alpha^2 T_0^2 + 2\alpha T_0 - 3 + 4e^{-\alpha T_0} - 2 + 2\alpha^2 T_0^2 e^{-\alpha T_0} - e^{-2\alpha T_0}\right] \\ q_{12} = \dfrac{1}{2\alpha^4}\left[1 - 2\alpha T_0 + 2\alpha^2 T_0^2 - \alpha^3 T_0^3 + \dfrac{\alpha^4 T_0^4}{2} + e^{-2\alpha T_0} - 2\alpha T_0 - 2e^{-\alpha T_0} - \alpha^2 T_0^2 e^{-\alpha T_0}\right] \\ q_{13} = \dfrac{1}{2\alpha^3}\left[2\alpha T_0 - \alpha^2 T_0^2 - \dfrac{\alpha^3 T_0^3}{3} - 3 - 2e^{-2\alpha T_0} + 4e^{-\alpha T_0} - \alpha^2 T_0^2 e^{-\alpha T_0}\right] \\ q_{14} = \dfrac{1}{2\alpha^3}[1 + e^{-2\alpha T_0} + 2e^{-2\alpha T_0} - 2\alpha^2 T_0^2 e^{-\alpha T_0}] \\ q_{22} = \dfrac{1}{2\alpha^3}\left[1 - e^{-2\alpha T_0} + \dfrac{4\alpha^3 T_0^3}{3} + 2\alpha T_0 - 2\alpha^2 T_0^2 - 4\alpha T_0 e^{-\alpha T_0}\right] \\ q_{23} = \dfrac{1}{2\alpha^2}[1 + \alpha^2 T_0^2 - 2\alpha T_0 + 2\alpha T_0 e^{-\alpha T_0} + e^{-2\alpha T_0} - 2e^{-\alpha T_0}] \\ q_{24} = \dfrac{1}{2\alpha^2}[1 - e^{-2\alpha T_0} - 2\alpha T_0 e^{-2\alpha T_0}] \\ q_{33} = \dfrac{1}{2\alpha^3}[4e^{-\alpha T_0} - e^{-2\alpha T_0} + 2\alpha T_0 - 3] \\ q_{34} = \dfrac{1}{2\alpha^2}[e^{-2\alpha T_0} + 1 - 2\alpha T_0] \\ q_{44} = \dfrac{1}{2\alpha}[1 - e^{-2\alpha T_0}] \end{cases} \quad (5)$$

With reference to the selection of the state transition parameter and the process noise parameter in the Jerk model, the corresponding parameters in other dynamical models can be extracted similarly. Based on the state transition parameter and the process noise parameter in (including but not limited to) the Jerk model for the capacity time sequence described above, the basic growth trend feature of the current detected capacity time sequence can be preliminarily acquired.

At step S130, Kalman filter estimation is performed on the capacity time sequence by using the state transition parameter and the process noise parameter to generate at least one state characteristic signal.

The Kalman filter involves an optimal autoregressive data processing algorithm, which can estimate the state of a dynamic system from a series of measured data incompletely including noise. Generally, before the Kalman filter estimates a system process, the system process needs to be modeled in advance to obtain a dynamical model as consistent with the change rule of the system process as possible. Then, two parameters, i.e., the above state transition parameter and process noise parameter, for the constructed dynamical model are extracted from the corresponding system state equation. The Kalman filter can estimate the change trend of original system process data over time accurately by utilizing the two parameters and the original system process data.

In this embodiment, the capacity time sequence is estimated under the dynamical model by using the Kalman filter to obtain on-line the estimated value of at least one state characteristic signal, including, for example, the position, the velocity, the acceleration or the acceleration derivative, corresponding to each time point in the capacity time sequence, and then the change rule of the capacity time sequence can be obtained by analyzing the estimated values.

At step S140, the capacity time sequence is segmented according to the at least one state characteristic signal, and at least one corresponding segmentation point is determined.

Figure 2:
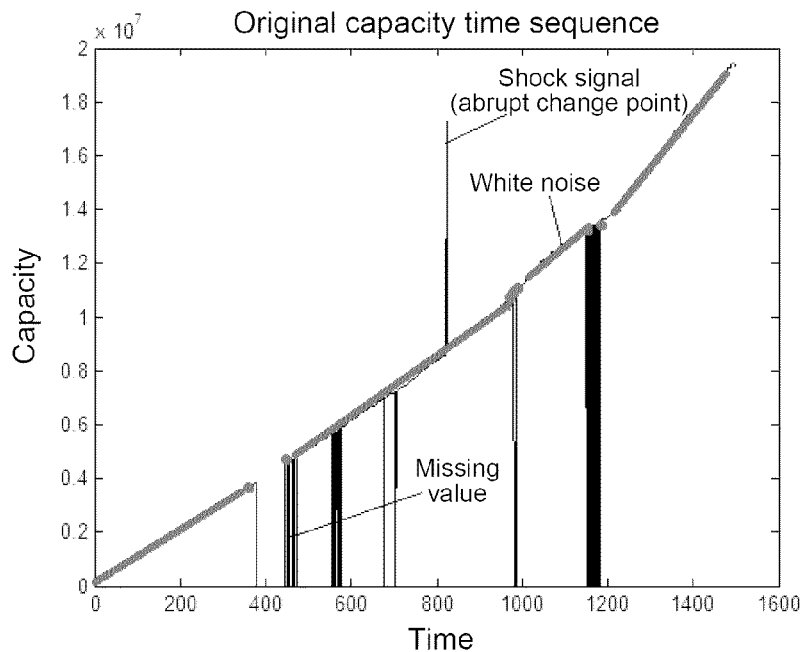
FIG. 2 is an exemplary schematic diagram of a capacity time sequence provided by the present invention.

Generally, before the dynamical model is established for the capacity time sequence, it is supposed that a data sequence to be studied is the sum of a basic trend and a noise component, namely that the observed capacity time sequence is:

$$Z_t = \mu_t + N_t \quad (6)$$

where $Z_t$ represents the observed capacity time sequence, $\mu_t$ is the basic trend, and $N_t$ is the independent noise process. As shown in FIG. 2, the $Z_t$ has the following characteristics: with noise and with "abrupt change points", and the basic trend $Z_t$ of data may have phase change, thus forming multiple small patterns with linear changes.

Figure 3:
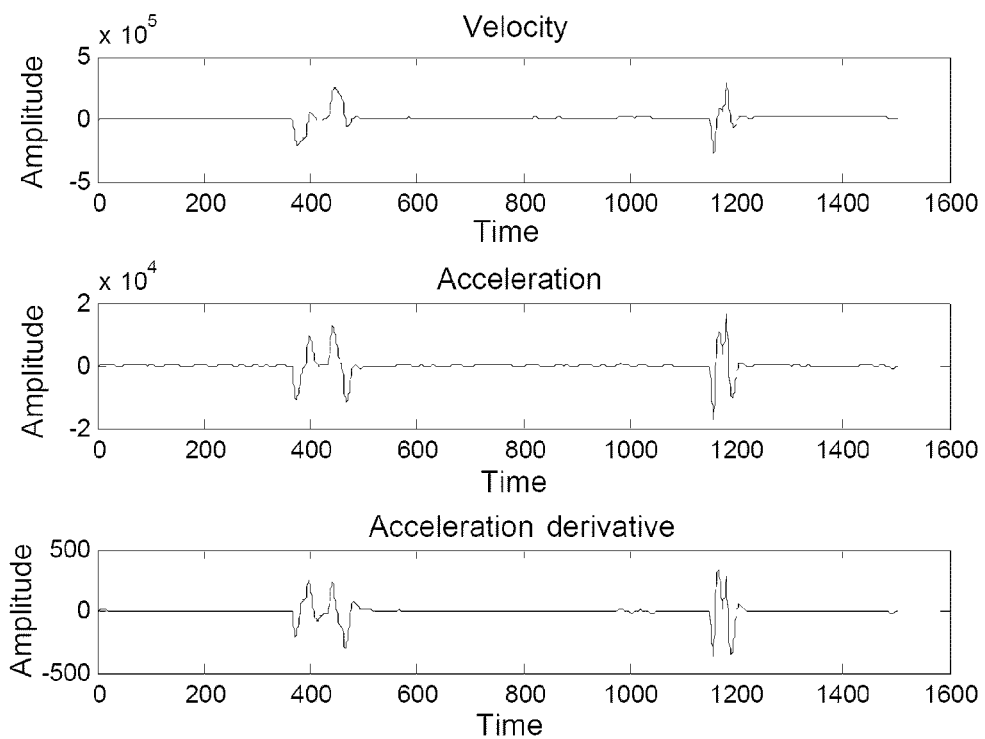
FIG. 3 is a schematic diagram of state characteristic signals of the capacity time sequence obtained after the Kalman filter based filtering provided by the present invention.

If the capacity time sequence is consistent with the established dynamical model, an optimal estimation result can be obtained by adopting the Kalman filter estimation within a linear pattern with relatively steady changes. However, within a transition section of a change between two adjacent different patterns, the capacity time sequence does not conform to the characteristics of Gaussian white noise, and the model estimation value is not consistent with the actual data, so that the forecasting value of the Kalman filter is greatly different from the corrected value. In this case, the Kalman filter can automatically adjust the velocity, the acceleration and the acceleration derivative to slowly perform tracking estimation learning, thus leading to "fluctuations" in this interval. FIG. 3 shows a diagram of state characteristic signals of the velocity, the acceleration and the acceleration derivative of the capacity time sequence obtained after the filtering by the Kalman filter.

It can be learnt from FIG. 3 that three patterns are present in the current studied capacity time sequence, and the "fluctuating" signals occur at the positions near 400 and 1200 in the time sequence, respectively.

The studied capacity time sequence can be segmented through the positions and the quantity of the "fluctuating" signal segments in at least one state characteristic signal of the velocity, the acceleration and the acceleration derivative in FIG. 3 (the number of segments can be determined according to the number of patterns in this embodiment), and at least one corresponding segmentation point is determined, wherein each segmentation point may be positioned on a "fluctuating" signal segment respectively.

At step S150, the capacity at future time is forecasted according to the at least one segmentation point determined in the capacity time sequence.

The change rule of the capacity time sequence in adjacent segmentation points (patterns) can be obtained according to the at least one segmentation point determined in the capacity time sequence, and then the change rule of the whole capacity time sequence is obtained, to forecast the capacity at future time. The growth trend of the capacity time sequence can be grasped more accurately by segmented forecasting as compared with unitary non-segmented forecasting, so that the forecasting result is more accurate. In the forecasting process, the change rule of the capacity time sequence within all patterns or part of patterns may be selected for capacity forecasting according to actual demands.

According to the Kalman filter based capacity forecasting method provided by the embodiment of the present invention, the dynamical model is established for the acquired capacity time sequence, then filter estimation is performed on the capacity time sequence under the dynamical model by using the Kalman filter to generate at least one state characteristic signal, the generated state characteristic signals are segmented, and the capacity at future time is forecasted according to the segmentation points, so that the forecasting accuracy is improved.

Embodiment II

Figure 4:
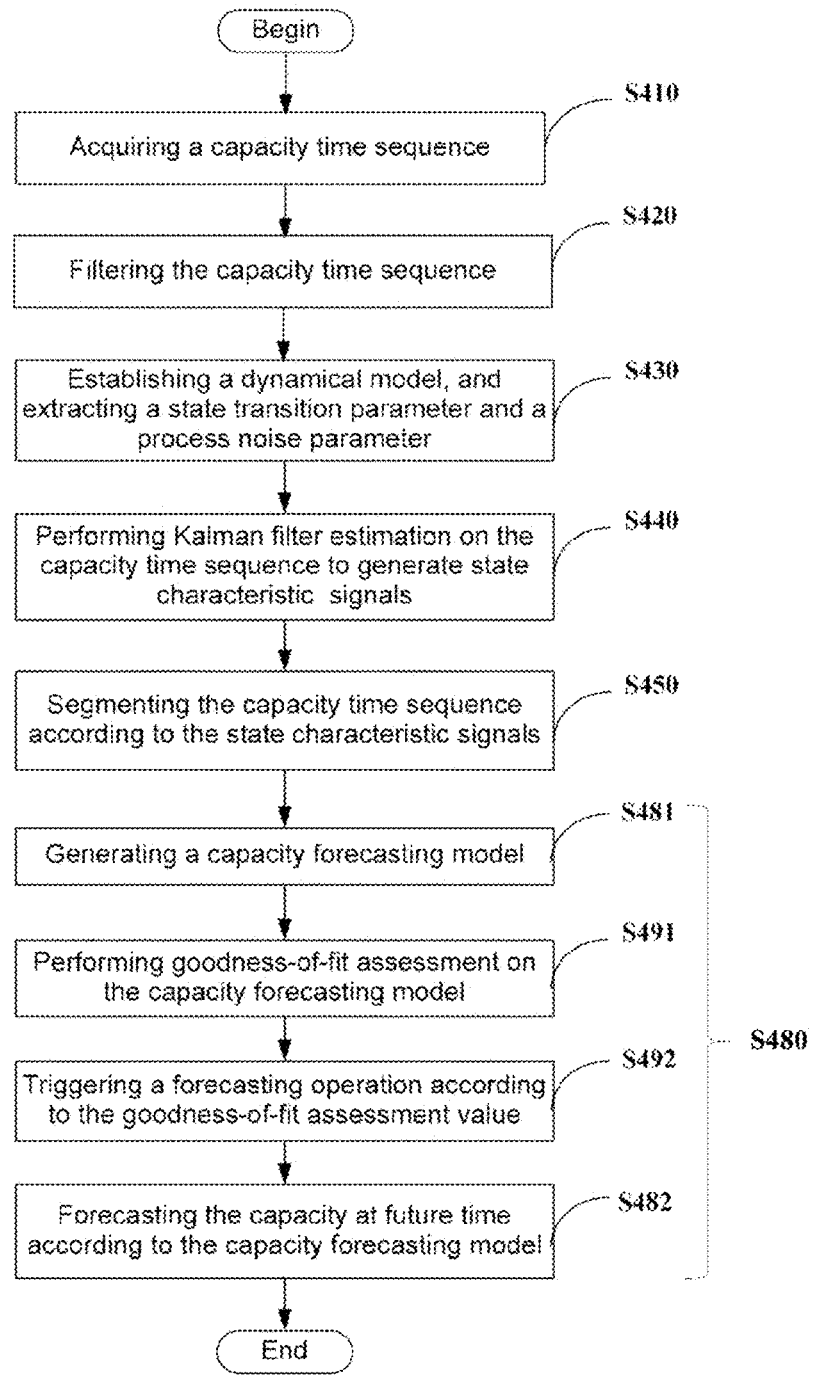
FIG. 4 is a method flowchart of another embodiment of the Kalman filter based capacity forecasting method provided by the present invention.

FIG. 4 is a method flowchart of another embodiment of the Kalman filter based capacity forecasting method provided by the present invention, which may be regarded as a specific implementation of the embodiment shown in FIG. 1. In this embodiment, the Jerk model is used as a dynamical model established for the capacity time sequence, and the state transition matrix A and the process noise variance matrix Q in the Jerk model are respectively used as the aforementioned state transition parameter and process noise parameter for the Kalman filter estimation of the capacity time sequence.

With reference to FIG. 4, a capacity time sequence of an object to be forecasted is acquired at step S410. The processing of step S410 is the same as that of step S110 above.

At step S430, a dynamical model is established for the capacity time sequence, and a state transition parameter and a process noise parameter of the dynamical model are extracted. The processing of step S430 is similar to that of step S120 above.

Specifically, the dynamical system state equation in the Jerk model is used as the dynamical model established for the studied capacity time sequence in this embodiment, and the state transition matrix A and the process noise variance matrix Q corresponding to the system state equation are extracted as the aforementioned state transition parameter and process noise parameter for the Kalman filter estimation of the capacity time sequence. The specific formulas for acquiring A and Q are shown in step S120, and are not redundantly described herein.

Before step S430, the acquired capacity time sequence of the object to be forecasted, as shown in FIG. 2, generally has the following characteristics: with noise, with a set of abrupt change points which greatly departs from the basic trend, and with stage changes in the basic trend. In order to realize the accurate forecasting, the noise and the abrupt change points need to be removed. Thus, step S420 for cleaning data of the capacity time sequence may be executed before step S430.

At step S420, the capacity time sequence is filtered by adopting median filtering and/or moving average filtering to generate a filtered capacity time sequence.

Specifically, the abrupt change points can be effectively removed from the data sequence by the median filtering, and the noise can be effectively removed from the data sequence by the moving average filtering. In the absence of obvious abrupt change points in the capacity time sequence, the median filtering can be omitted, and only the moving average filtering is adopted, to simplify the process.

Figure 5:
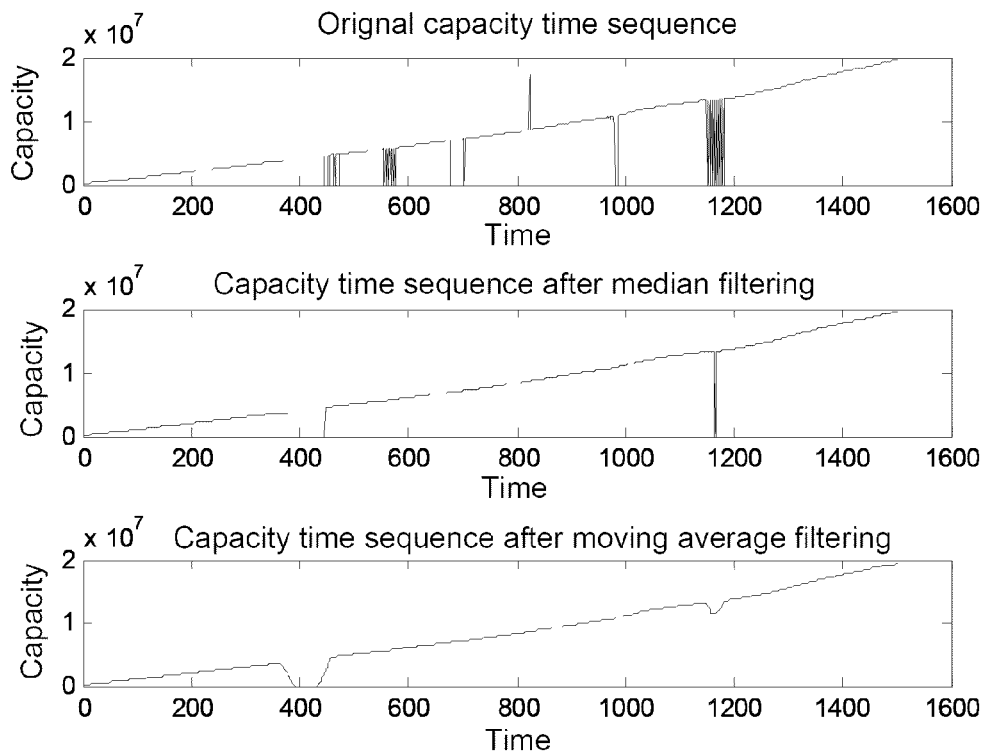
FIG. 5 is a schematic diagram of signals obtained after median filtering and moving average filtering of the capacity time sequence provided by the present invention.

Preferably, the capacity time sequence is sequentially filtered by adopting the median filtering and the moving average filtering in this embodiment to obtain the basic trend of the capacity time sequence. FIG. 5 is a schematic diagram of signals obtained after the median filtering and the moving average filtering of the capacity time sequence.

At step S440, the Kalman filter estimation is performed on the capacity time sequence by using the state transition parameter and the process noise parameter to generate at least one state characteristic signal. The processing of step S440 is similar to that of step S130 above.

Specifically, the system state equation in the Jerk model is used as the dynamical model established for the forecasted capacity time sequence in this embodiment, so the state transition matrix A and the process noise variance matrix Q corresponding to the system state equation can be directly adopted as the state transition parameter and the process noise parameter respectively for the Kalman filter estimation of the capacity time sequence, to generate at least one state characteristic signal of the velocity, the acceleration and the acceleration derivative.

The filtering process of the Kalman filter will be described below, taking the system state equation in the Jerk model as an example. Generally, the filtering process of the Kalman filter mainly includes two steps of state forecasting and correction.

(1) State Forecasting

The next state of a capacity mass point is forecasted by utilizing the corresponding state transition matrix A of the capacity time sequence in the Jerk model. If the present system state is k, the current state can be forecasted on the basis of previous state of the system according to the state transition matrix A.

$$X(k|k-1)=AX(k-1|k-1)+BU(k) \qquad (7)$$

In formula (7), X (k|k−1) is a forecasting result obtained by using the previous state, X (k−1|k−1) is an optimal result of the previous state, and U(k) is a control quantity of the current state. Since there is no control quantity in the capacity sequence, U(k)=0.

The result of X (k−1|k−1) has been updated in formula (7), but the variance corresponding to X (k|k−1) has not been updated. If P represents the variance, obtained is:

$$P(k|k-1)=AP(k-1|k-1)A^T+Q \qquad (8)$$

wherein P (k|k−1) is a variance corresponding to X (k|k−1), P (k−1|k−1) is a variance corresponding to X(k−1|k−1), $A^T$ expresses a transposed matrix of A, and Q is a process noise variance matrix of the system. The state of the system can be forecasted by using formulas (6) and (7).

(2) Correction

Based on the forecasting result of the current state and the measurement sequence Z(k) of the current state, the optimal estimated value X (k|k) of the current state k can be obtained by:

$$X(k|k)=X(k|k-1)+Kg(k)(Z(k)-HX(k|k-1)) \qquad (9)$$

where H is a measurement matrix, which may be set as H=[1 0 0 0], and Kg is Kalman gain:

$$Kg=P(k|k-1)H^T/(HP(k|k-1)H^T+R) \qquad (10)$$

In order that the Kalman filter continuously runs till the system process is ended, the variance of X (k|k) in the state k needs to be updated.

$$P(k|k)=(I-Kg(k)H)P(k|k-1) \qquad (11)$$

where I is a unit matrix, and when the system enters the state k+1, P(k|k) is P(k−1|k−1) in formula (7). In this way, the whole algorithm can be autoregressively operated.

Through formulas (7)-(11), the whole Kalman filter estimation can be completed, and the state characteristic signals of the position, the velocity, the acceleration, the acceleration derivative and the like of the capacity time sequence can be estimated and extracted. The state characteristic signals are relatively steady signals, and can better reflect the main features of the change trend of the capacity time sequence.

At step S450, the capacity time sequence is segmented according to the at least one state characteristic signal, and at least one corresponding segmentation point is determined. The processing of step S450 is similar to that of step S140 above.

Specifically, the system state equation in the Jerk model is adopted as the dynamical model established for the forecasted capacity time sequence in this embodiment, so the capacity time sequence can be segmented according to the state characteristic signals, including one of the velocity, the acceleration and the acceleration derivative, generated by Kalman filter estimation on the capacity time sequence in the Jerk model, and at least one corresponding segmentation point is determined.

Figure 6:
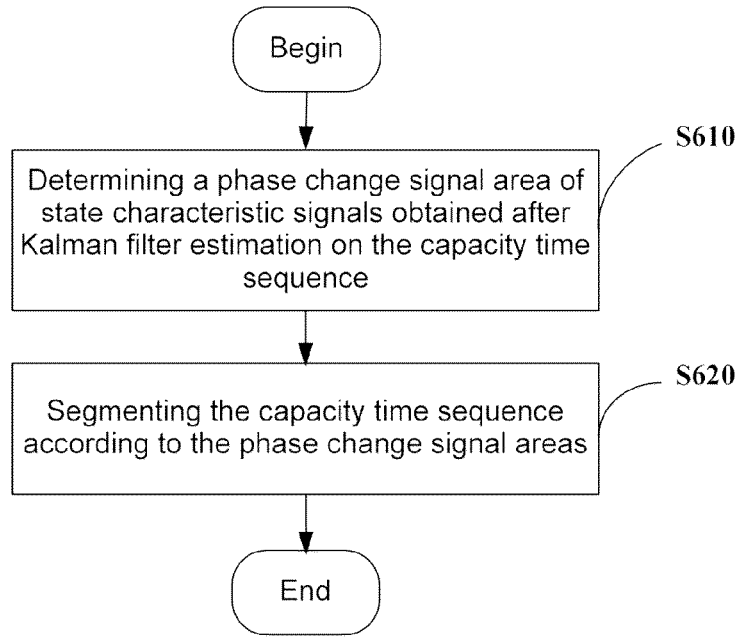
FIG. 6 is a flowchart of a method for determining segmentation points based on state characteristic signals provided by the present invention.

In the process of segmenting the capacity time sequence according to the state characteristic signals, this embodiment gives a specific segmenting method, including the method steps as shown in FIG. 6.

Referring to FIG. 6, a flowchart of a method for determining segmentation points according to state characteristic signals provided by the present invention is illustrated.

At step S610, at least one phase change signal area is determined for at least one of the signals of the velocity, the acceleration and the acceleration derivative obtained after the Kalman filter estimation on the capacity time sequence.

The estimation value of the Kalman filter is not matched with the capacity time sequence data at a transition section between two adjacent patterns in the capacity time sequence, namely nearby a segmentation point. At the moment, the Kalman filter adjusts self state parameters to realize matching estimation, as a result, the system state characteristic signal in the area nearby the segmentation point is obviously different from that within the adjacent patterns. Herein, the obviously different state characteristic signals are referred to as phase change points or suspected segmentation points, and the area constituted by the phase change points or suspected segmentation points is referred to as a phase change signal area.

Because the signals in the phase change signal area and the signals in the adjacent pattern have obviously different features (e.g., the "fluctuation" feature), the signals can be mathematically analyzed to determine at least one phase change signal area.

This embodiment provides a statistical analysis method, in which significance analysis is performed on high-order state characteristic signals of the system state extracted by the Kalman filter such as the velocity, the acceleration, the acceleration derivative to detect the suspected segmentation points in terms of probability, and then a phase change signal area is determined by utilizing the obtained suspected segmentation points.

Specifically, the statistical analysis method comprises the following steps:

Step 1, for at least one of the signals of the velocity, the acceleration and the acceleration derivative obtained after the Kalman filter estimation on the capacity time sequence, the variances or means of the signals within every two sliding windows are calculated according to the time sequence by adopting two continuous sliding windows with the same length.

It is supposed that the widths of the two sliding windows are 24, then the first pair of sliding windows calculated according to the time sequence is respectively 1~24 and 25~48, and the variances or means of all capacities in the corresponding capacity time sequence within the two windows are calculated. After the calculation, the two sliding windows are moved backwards according to the time point sequence, namely the second pair of sliding windows is respectively 2~25 and 26~49, . . . , the sliding windows are sequentially moved till the last time point, and the variances or means of the signals within every two sliding windows are calculated.

Step 2, if the probability that the variances or means of the signals within the two sliding windows are not identical is greater than a preset corresponding probability threshold, the intermediate point between the two continuous sliding windows is marked as a suspected segmentation point.

The suspected segmentation point is determined herein according to the degree of difference between two variances or means within each pair of windows. In statistics, F-test is often adopted for different variances, and T-test or permutation test is often adopted for different means. The tests for the two parameters will be described respectively below.

1. Test for Different Variances

It is supposed that each of a pair of windows $Y_1$ and $Y_2$ selected every time complies with the normal distribution and has samples with the same variance. The probability that the vector variances of $Y_1$ and $Y_2$ are identical can be solved through mathematical analysis, e.g. a vartest2 function in Matlab, and then the probability that the sample variances of $Y_1$ and $Y_2$ are different can be solved. When the probability that the two variances are different is greater than a corresponding preset probability threshold, e.g. 0.99, the variances of data within the two sliding windows are regarded as different; and the intermediate point between the two continuous sliding windows is determined as a suspected segmentation point. For example, the intermediate point of the first pair of sliding windows with the lengths of 24 may be any point of 24 and 25.

2. Test for Different Means

Similar to the test for different variances, firstly, two sliding windows with the same length are set, and the windows $Y_1$ and $Y_2$ comply with the normal distribution and have samples with the same mean. Then, the probability that the vector means of $Y_1$ and $Y_2$ are identical is solved through the T-test or the permutation test in statistics, and the probability that the sample means of $Y_1$ and $Y_2$ are different can be further solved. When the probability that the two means are different is greater than a corresponding preset probability threshold, e.g. 0.99, the means of data within the two sliding windows are regarded as different; and the intermediate point between the two continuous sliding windows is determined as a suspected segmentation point. For example, the intermediate point of the first pair of sliding windows with the lengths of 24 may be any point of 24 and 25.

Figure 7:
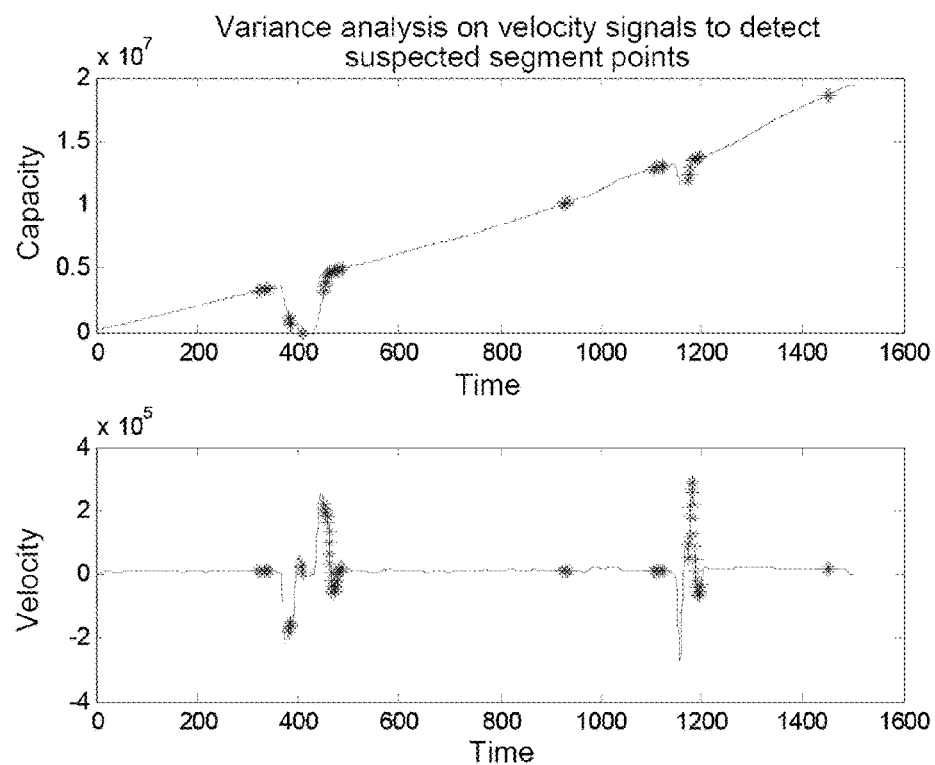
FIG. 7 is an exemplary diagram of suspected segmentation points determined by variance analysis test on the velocity of the capacity time sequence provided by the present invention.
Figure 8:
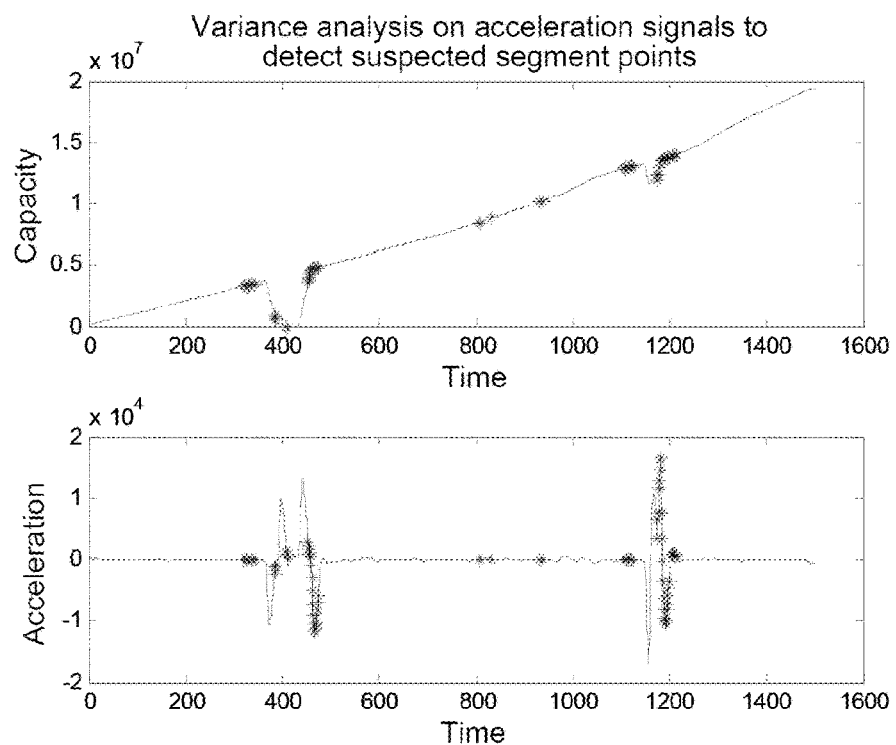
FIG. 8 is an exemplary diagram of suspected segmentation points determined by variance analysis test on the acceleration of the capacity time sequence provided by the present invention.
Figure 9:
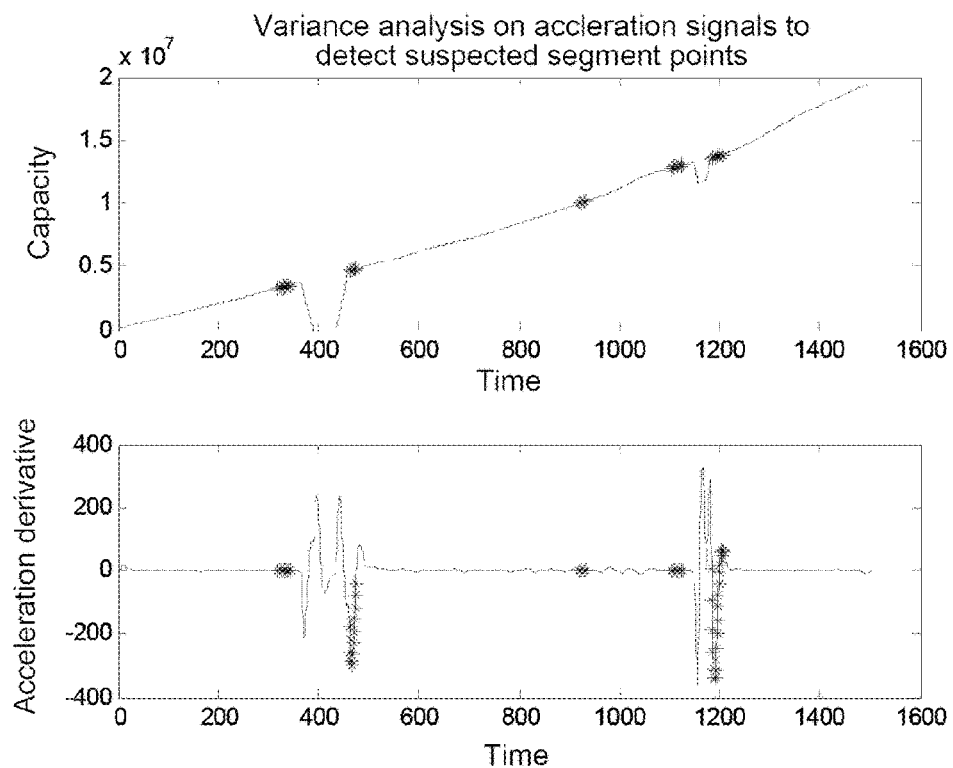
FIG. 9 is an exemplary diagram of suspected segmentation points determined by variance analysis test on the acceleration derivative of the capacity time sequence provided by the present invention.

At least one suspected segmentation point on the capacity time sequence can be determined by the test for different variances and the test for different means above. FIGS. 7, 8 and 9 respectively show suspected segmentation points determined by variance analysis and test on the velocity, the acceleration and the acceleration derivative of the capacity time sequence. It can be seen from the figures that the suspected segmentation points are not distributed uniformly in the whole capacity time sequence, but concentrated in the "fluctuating" signal areas of the transition sections.

Step 3, a signal area constituted by a plurality of continuous suspected segmentation points is determined as a phase change signal area of the capacity time sequence. The signals actually with phase change may be distributed in the whole capacity time sequence, particularly, concentrated in the transition sections between two adjacent patterns. Thus, it is more reasonable to select a plurality of detected continuous suspected segmentation points and take the signal area constituted by the suspected segmentation points as a phase change signal area of the capacity time sequence. Specifically, the position of the phase change signal area can be further determined by setting conditions of the number of continuous suspected segmentation points required for determining a phase change signal area and the spacing between the two continuous suspected segmentation point areas.

At step S620, the capacity time sequence is segmented according to the at least one determined phase change signal area, and at least one corresponding segmentation point is determined.

After the phase change signal area in the capacity time sequence is determined, any point in the area can be selected as a segmentation point.

Specifically, in every phase change signal area, the suspected segmentation point corresponding to the maximum variance difference or the maximum mean difference of the signals within the aforementioned two sliding windows can be determined as the segmentation point. On these segmentation points, the "fluctuation" change of the signals can be defaulted as maximum; or the intermediate point in each phase change signal area is determined as a segmentation point. The rule for determining the segmentation points is not limited herein.

So far, the determination of the segmentation points in the capacity time sequence is completed. However, the above determining process of the segmentation points still has a problem, that is, the studied object for determining the segmentation points are state characteristic signals of the capacity time sequence, including the velocity, the acceleration and the acceleration derivative signals, and then the segmentation points determined by which signal are more accurate? Thus, the concepts of precision ratio and recall ratio are introduced in this embodiment. Taking the phase change points (suspected segmentation points) obtained by variance analysis as an example, the definitions are as follows:

Precision ratio=total number of real phase change points detected by variance analysis/total number of points detected by variance analysis (12)

Recall ratio=total number of real phase change points detected by variance analysis/total number of phase change points desired to be detected (13)

wherein the total number of real phase change points detected by variance analysis is the total number of the finally determined segmentation points in the capacity time sequence; the total number of points detected by variance analysis is the total number of the suspected segmentation points; and the total number of phase change points desired to be detected is a constant artificially determined by observing the basic trend of a sample. The higher the precision ratio is, the more the detected real phase change points are; and the higher the recall ratio is, the more the phase change points detectable by variance analysis are.

By performing a computational analysis on the precision ratio and the recall ratio of the suspected segmentation points determined by the variance analysis on the velocity, the acceleration and the acceleration derivative on the capacity time sequence as shown in FIGS. 7, 8 and 9, the results as shown in table 1 are obtained.

TABLE 1

Calculation and analysis results of precision ratio and recall ratio

| Signal | Precision Ratio | Recall Ratio |
|---|---|---|
| Velocity | 71.4 | 100 |
| Acceleration | 71.4 | 100 |
| Acceleration Derivative | 100 | 100 |

It can be seen from table 1 that the acceleration derivative signal has very high precision ratio and recall ratio, so when the segmentation points of the capacity time sequence are to be determined, the variance analysis detection result of the acceleration derivative signal can be utilized for segmenting, thus ensuring that the capacity forecasting model generated later is more accurate. It should be noted herein that although the velocity, the acceleration and the acceleration derivative signals can all be used for detecting the segmentation points through variance analysis, the detection results from different signals are different in goodness, and it is discovered by testing massive data samples that the detection result is generally better when the acceleration or the acceleration derivative signals are used for the variance analysis. Therefore, the capacity forecasting is preferably performed on the basis of segmenting the acceleration or the acceleration derivative signals in this embodiment.

Next, at step S480, the capacity at future time is forecasted according to the at least one segmentation point determined in the capacity time sequence. The processing of step S480 is similar to that of step S150 above.

Based on the above, this embodiment shows a specific implementation of forecasting the capacity at future time, including steps S481 to S482:

Step S481, taking the last segmentation point in the capacity time sequence as a starting point, linearly or nonlinearly fitting the data of the capacity time sequence thereafter to generate a capacity forecasting model; and step S482, forecasting the capacity at future time according to the capacity forecasting model. During the actual forecasting, it is also possible to perform the fitting of the capacity time sequence that has been filtered by the Kalman filter at a corresponding position to generate thea capacity forecasting model.

In order to forecast the capacity at future time under the condition that the generated capacity forecasting model approximately complies with the actual change rule of the capacity time sequence, steps S491 and S492 can also be executed before step S482 in this embodiment to judge the reasonability and the accuracy of the generated capacity forecasting model.

At step S491, goodness-of-fit assessment is performed on the generated capacity forecasting model.

Figure 10:
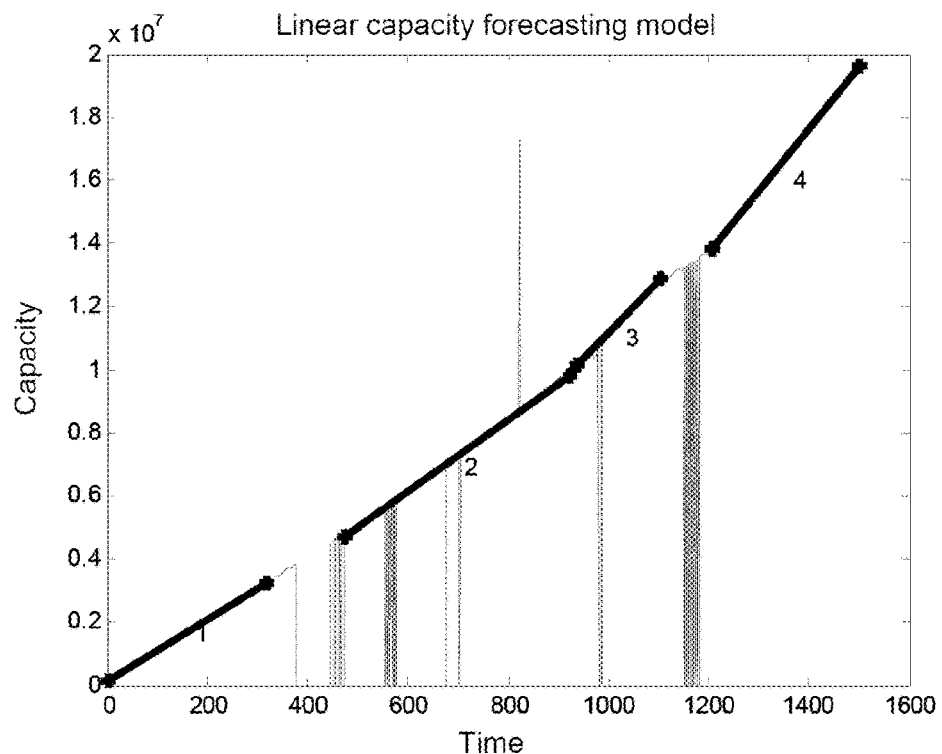
FIG. 10 is an exemplary diagram of four segment signals in the capacity time sequence obtained by variance analysis and segmentation on the acceleration signals in FIG. 8.

Generally, in order to assess the goodness of a fitting model, goodness of fit is adopted for assessment. FIG. 10 shows the fitting of four patterns in the capacity time sequence obtained by performing the variance analysis and segmentation on the acceleration signals in FIG. 8 above with a linear regression method, taking $R^2$ as an assessment criterion, wherein the goodness of fit and the corresponding pattern number are shown in table 2.

TABLE 2

Goodness-of-fit assessment results
of the capacity forecasting model

| Pattern No. | Goodness of Fit |
| --- | --- |
| 1 | R2 = 0.999293 |
| 2 | R2 = 0.997479 |
| 3 | R2 = 0.991105 |
| 4 | R2 = 0.997525 |

It can be seen from table 2 that the goodness of fit of all the four patterns of the capacity forecasting model adopted in this embodiment are more than 0.9 and even more than 0.99, which indirectly demonstrates that the segmenting method for the capacity time sequence in this embodiment is relatively reasonable.

At step S492, if the assessment value obtained by the goodness-of-fit assessment is greater than a preset goodness-of-fit threshold, a processing operation of forecasting the capacity at future time according to the capacity forecasting model is triggered.

The preset goodness-of-fit threshold can be 0.99. The generation of the capacity forecasting model by using the capacity time sequence in the last pattern (pattern 4) in this embodiment will be described in conjunction with FIG. 10. In the change process of the capacity time, the capacity is defaulted to change in a manner close to the growth trend of the last stably changed pattern with a greater probability within a near future time period. Thus, the last segmentation point in the capacity time sequence is selected as a starting point to perform curve or linear fitting on the data thereafter, thus forecasting the future capacity data more reasonably and accurately.

Table 3 shows statistical results of the forecasted values obtained by forecasting the data in the last pattern with a capacity forecasting model generated according to the data of the last pattern in the capacity time sequence as shown in FIG. 10 and real values of this pattern.

TABLE 3

Statistical results of forecasted values and real values

| Forecasted Point | Real Value | Forecasted Value | Error | Relative Error(%) |
| --- | --- | --- | --- | --- |
| 1501 | 19405616 | 19626584 | 220967.71 | 1.14 |
| 1502 | 19402632 | 19646480 | 243847.92 | 1.26 |
| 1503 | 19401049 | 19666376 | 265327.13 | 1.37 |
| 1504 | 19399736 | 19686272 | 286536.34 | 1.48 |
| 1505 | 19396443 | 19706169 | 309725.55 | 1.60 |
| 1506 | 19394328 | 19726065 | 331736.76 | 1.71 |

The capacity forecasting model is y=19896x−10237629.1031976. X is the position (corresponding to a time node) of a forecasted point, and y is a capacity value. The error is the difference between the forecasted value and the real value, and the relative error is the ratio of the error to the real value. It can be seen from table 3 that all the relative errors are less than 2%, and even if engineers with rich work experience carry out forecasting only in an artificial way, the relative errors are about 5%, so the capacity forecasting model generated in this embodiment has a very good forecasting effect.

According to the Kalman filter based capacity forecasting method provided by the embodiment of the present invention, based on the method embodiment shown in FIG. 1, the corresponding state transition matrix A and process noise variance matrix Q are extracted by taking the system state equation in the Jerk model as an example to implement the Kalman filter estimation of the capacity time sequence; the capacity time sequence is segmented according to the high-order state characteristic signals obtained by the Kalman filter estimation, e.g. the velocity, the acceleration and the acceleration derivative; and finally, taking the last segmentation point as a starting point, the capacity time sequence thereafter is fitted to generate a capacity forecasting model, and the capacity at future time is forecasted. Therefore, the forecasting accuracy is improved.

The foregoing descriptions are merely specific embodiments of the present invention, but the protection scope of the present invention is not limited thereto. Any variation or substitution readily conceivable to those skilled in the art within the technical scope disclosed in the present invention shall fall within the protection scope of the present invention. Accordingly, the protection scope of the present invention should be defined by the protection scope of the accompanying claims.

Embodiment III

Figure 11:
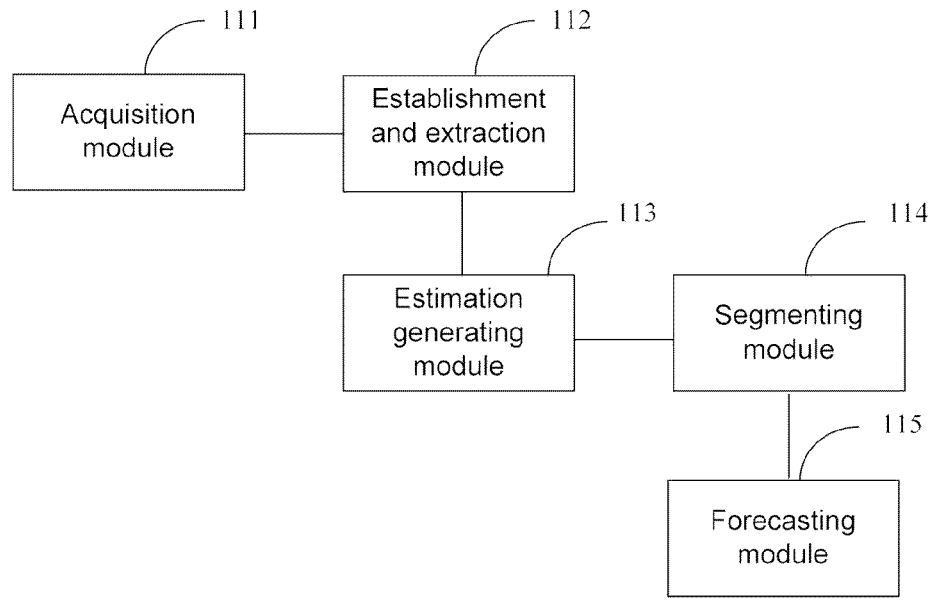
FIG. 11 is a structural schematic diagram of an embodiment of a Kalman filter based capacity forecasting system provided by the present invention.

FIG. 11 is a structural schematic diagram of an embodiment of a Kalman filter based capacity forecasting system provided by the present invention, which can be used for executing the method steps in the embodiment as shown in FIG. 1.

With reference to FIG. 11, the Kalman filter based capacity forecasting system specifically includes an acquisition module 111, an establishment and extraction module 112, an estimation generating module 113, a segmenting module 114 and a forecasting module 115, wherein the acquisition module 111 is used for acquiring a capacity time sequence of an object to be forecasted; the establishment and extraction module 112 is used for establishing a dynamical model for the capacity time sequence, and extracting a state transition parameter and a process noise parameter of the dynamical model; the estimation generating module 113 is used for performing Kalman filter estimation on the capacity time sequence by using the state transition parameter and the process noise parameter to generate at least one state characteristic signal; the segmenting module 114 is used for segmenting the capacity time sequence according to the at least one state characteristic signal, and determining at least one corresponding segmentation point; and the forecasting module 115 is used for forecasting the capacity at future time according to the at least one segmentation point determined in the capacity time sequence.

According to the Kalman filter based capacity forecasting system provided by the embodiment of the present invention, the dynamical model is established for the acquired capacity time sequence, then filter estimation is performed on the capacity time sequence under the dynamical model by using the Kalman filter to generate at least one state characteristic signal, the generated state characteristic signals are segmented, and the capacity at future time is forecasted according to the segmentation points, so that the forecasting accuracy is improved.

Embodiment IV

Figure 12:
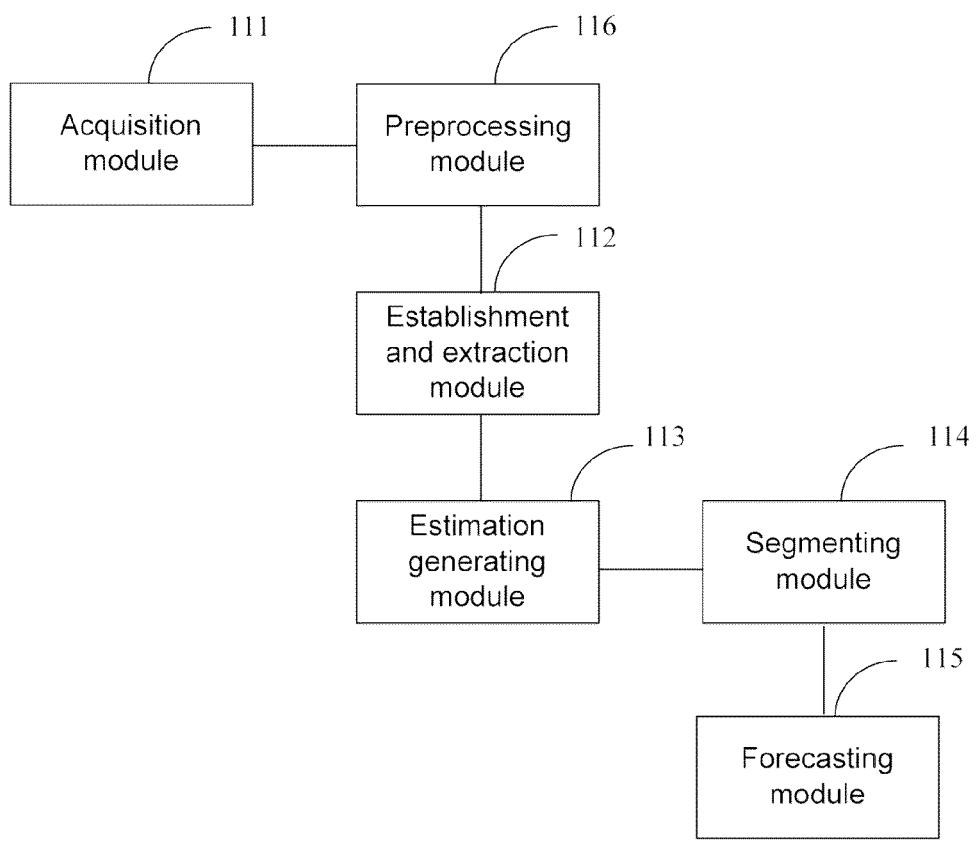
FIG. 12 is a structural schematic diagram of another embodiment of the Kalman filter based capacity forecasting system provided by the present invention.

FIG. 12 is a structural schematic diagram of another embodiment of the Kalman filter based capacity forecasting system provided by the present invention, which can be regarded as a specific implementation structure of the embodiment shown in FIG. 11 and used for executing the method steps in the embodiment shown in FIG. 4.

With reference to FIG. 12, the Kalman filter based capacity forecasting system includes an acquisition module 111, an establishment and extraction module 112, an estimation generating module 113, a segmenting module 114 and a forecasting module 115, which are the same as the corresponding modules in FIG. 11.

Moreover, the Kalman filter based capacity forecasting system as shown in FIG. 12 may further include a preprocessing module 116 for filtering the capacity time sequence by adopting the median filtering and/or the moving average filtering to generate a filtered capacity time sequence.

Further, the above dynamical model may include at least one of a constant velocity (CV) model, a constant acceleration (CA) model, a Singer model, a current statistical model and a Jerk model.

Further, the establishment and extraction module 112 may also be used for constructing a system state equation under the Jerk model for the capacity time sequence, and extracting a state transition matrix A and a process noise variance matrix Q corresponding to the system state equation.

Further, the estimation generating module 113 is also used for performing Kalman filter estimation on the capacity time sequence by using the state transition matrix A and the process noise variance matrix Q, and generating at least one state characteristic signal of the velocity, the acceleration and the acceleration derivative.

Further, the segmenting module 114 is also used for segmenting the capacity time sequence according to the at least one state characteristic signal of the velocity, the acceleration and the acceleration derivative obtained after the Kalman filter estimation on the capacity time sequence, and determining at least one corresponding segmentation point.

Figure 13:
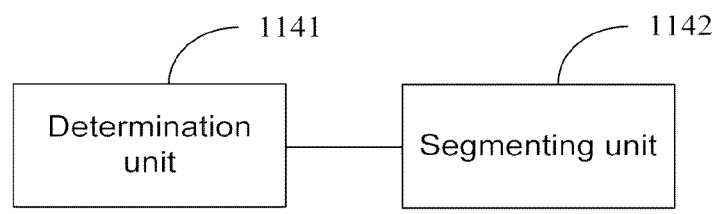
FIG. 13 is a structural schematic diagram of a segmenting module in FIG. 12.

Further, FIG. 13 is a specific structural schematic diagram of the segmenting module 114 above, and the segmenting module 114 may include a determination unit 1141, used for determining at least one phase change signal area for at least one of the signals of the velocity, the acceleration and the acceleration derivative obtained after the Kalman filter estimation on the capacity time sequence; and a segmenting unit 1142, used for segmenting the capacity time sequence according to the at least one determined phase change signal area, and determining at least one corresponding segmentation point.

Further, the determination unit 1141 is also used for calculating, for at least one of the signals of the velocity, the acceleration and the acceleration derivative obtained after the Kalman filter estimation on the capacity time sequence, the variances or means of the signals within every two sliding windows according to the time sequence by adopting two continuous sliding windows with the same length; if the probability that the variances or means of the signals within the two sliding windows are not identical is greater than a preset corresponding probability threshold, marking the intermediate point between the two continuous sliding windows as a suspected segmentation point; and determining a signal area constituted by a plurality of continuous suspected segmentation points as a phase change signal area of the capacity time sequence.

Further, the segmenting unit 1142 is also used for determining, in each phase change signal area, the suspected segmentation point corresponding to the maximum of the differences of the variances or the maximum of the differences of the means of the signals within the two sliding windows as a segmentation point.

Further, the segmenting unit 1142 is also used for determining the intermediate point in each phase change signal area as a segmentation point.

Figure 14:
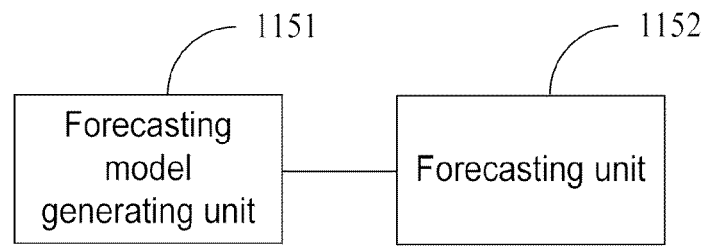
FIG. 14 is a structural schematic diagram of a forecasting module in FIG. 12.

Further, FIG. 14 is a specific structural schematic diagram of the forecasting module 115. As shown in FIG. 14, the forecasting module 115 may further include a forecasting model generating unit 1151, used for, taking the last segmentation point in the capacity time sequence as a starting point, linearly or nonlinearly fitting the data of the capacity time sequence thereafter to generate a capacity forecasting model; and a forecasting unit 1152, used for forecasting the capacity at future time according to the capacity forecasting model.

Figure 15:
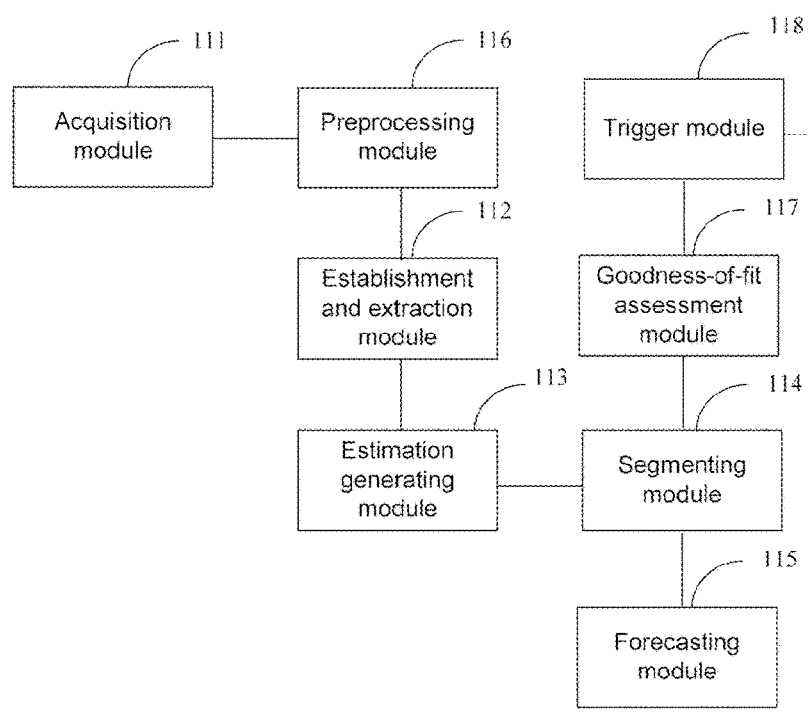
FIG. 15 is a structural schematic diagram of a further embodiment of the Kalman filter based capacity forecasting system provided by the present invention.

Further, as shown in FIG. 15, the Kalman filter based capacity forecasting system as shown in FIG. 12 may further include a goodness-of-fit assessment module 117, used for performing goodness-of-fit assessment on the generated capacity forecasting model; and a trigger module 118, used for, if the assessment value obtained by the goodness-of-fit assessment is greater than a preset goodness-of-fit threshold, triggering the forecasting unit to execute a processing operation of forecasting the capacity at future time according to the capacity forecasting model.

The method steps of the method embodiments shown in FIGS. 4, 5 and 6 can be executed by the corresponding functional modules in FIGS. 11-15, and therefore the step principles are not redundantly described herein.

According to the Kalman filter based capacity forecasting system provided by the embodiment of the present invention, based on the system embodiment shown in FIG. 11, the corresponding state transition matrix A and process noise variance matrix Q are extracted by taking the system state equation in the Jerk model as an example to implement Kalman filter estimation of the capacity time sequence; the capacity time sequence is segmented according to the high-order state characteristic signals obtained by the Kalman filter estimation, e.g. the velocity, the acceleration and the acceleration derivative; and finally, taking the last segmentation point as a starting point, the capacity time sequence thereafter is fitted to generate a capacity forecasting model, and the capacity at future time is forecasted. Therefore, the forecasting accuracy is improved.

Figure 16:
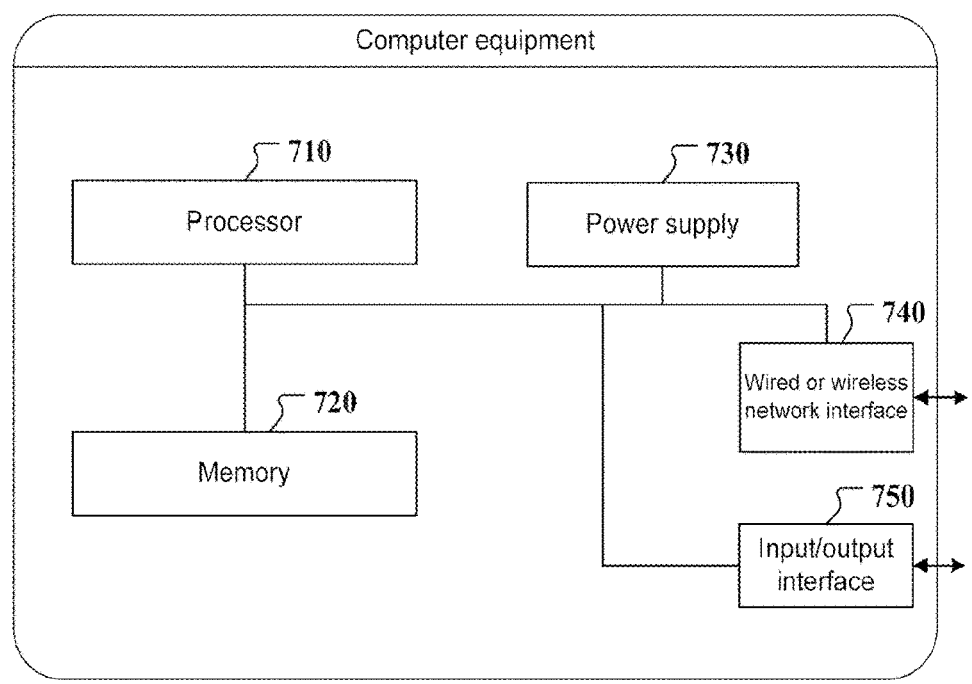
FIG. 16 is a structural schematic diagram of an embodiment of computer equipment provided by the present invention.

FIG. 16 is a structural schematic diagram of an embodiment of computer equipment provided by the present invention.

With reference to FIG. 16, the computer equipment can be used for implementing the Kalman filter based capacity forecasting method provided in the above embodiments. Specifically, the computer equipment may be greatly different due to different configuration or performance, and may include one or more processors (e.g. Central Processing Units, CPU) 710 and a memory 720. The memory 720 may be a volatile memory or a nonvolatile memory. One or more programs can be stored in the memory 720, and each program may include a series of instruction operations in the computer equipment. Further, the processor 710 can communicate with the memory 720, and execute the series of instruction operations in the memory 720 on the computer equipment. Particularly, data of one or more operating systems, e.g. Windows Server™, Mac OS X™, Unix™, Linux™, FreeBSD™, etc., are further stored in the memory 720. The computer equipment may further include one or more power supplies 730, one or more wired or wireless network interfaces 740, one or more input/output interfaces 750, etc.

Specifically, in this embodiment, the computer equipment includes one or more processors 710, a memory 720 and one or more programs, wherein the one or more programs are stored in the memory 720, and the one or more processors 710 are configured to execute the instructions included in the one or more programs for executing a Kalman filter based capacity forecasting method: acquiring a capacity time sequence of an object to be forecasted; establishing a dynamical model for the capacity time sequence, and extracting a state transition parameter and a process noise parameter of the dynamical model; performing the Kalman filter estimation on the capacity time sequence by using the state transition parameter and the process noise parameter to generate at least one state characteristic signal; segmenting the capacity time sequence according to the at least one state characteristic signal, and determining at least one corresponding segmentation point; and forecasting the capacity at future time according to the at least one segmentation point determined in the capacity time sequence.

Further, the memory 720 also stores an instruction for executing the following processing: filtering the capacity time sequence by adopting the median filtering and/or the moving average filtering to generate a filtered capacity time sequence. Optionally, the dynamical model includes at least one of a constant velocity (CV) model, a constant acceleration (CA) model, a Singer model, a current statistical model and a Jerk model.

Further, the memory 720 also stores an instruction for executing the following processing: constructing a system state equation under the Jerk model for the capacity time sequence, and extracting a state transition matrix A and a process noise variance matrix Q corresponding to the system state equation.

Further, the memory 720 also stores an instruction for executing the following processing: performing the Kalman filter estimation on the capacity time sequence by using the state transition matrix A and the process noise variance matrix Q, and generating at least one state characteristic signal of the velocity, the acceleration and the acceleration derivative.

Further, the memory 720 also stores an instruction for executing the following processing: segmenting the capacity time sequence according to the at least one state characteristic signal of the velocity, the acceleration and the acceleration derivative obtained after the Kalman filter estimation on the capacity time sequence, and determining at least one corresponding segmentation point.

Preferably, the memory 720 further stores an instruction for executing the following processing: determining at least one phase change signal area for at least one of the signals of the velocity, the acceleration and the acceleration derivative obtained after the Kalman filter estimation on the capacity time sequence; segmenting the capacity time sequence according to the at least one determined phase change signal area, and determining at least one corresponding segmentation point.

Further, the memory 720 also stores an instruction for executing the following processing: for at least one of the signals of the velocity, the acceleration and the acceleration derivative obtained after the Kalman filter estimation on the capacity time sequence, calculating the variances or means of the signals within every two sliding windows according to the time sequence by adopting two continuous sliding windows with the same length; if the probability that the variances or means of the signals within the two sliding windows are not identical is greater than a preset corresponding probability threshold, marking the intermediate point between the two continuous sliding windows as a suspected segmentation point; and determining a signal area constituted by a plurality of continuous suspected segmentation points as a phase change signal area of the capacity time sequence.

Further, the memory 720 also stores an instruction for executing the following processing: in each phase change signal area, determining the suspected segmentation point corresponding to the maximum of the differences of the variances or the maximum of the differences of the means of the signals within the two sliding windows as a segmentation point.

Preferably, the memory 720 further stores an instruction for executing the following processing: determining the intermediate point in each phase change signal area as a segmentation point.

Further, the memory 720 also stores an instruction for executing the following processing: taking the last segmentation point in the capacity time sequence as a starting point, linearly or nonlinearly fitting the data of the capacity time sequence thereafter to generate a capacity forecasting model; and forecasting the capacity at future time according to the capacity forecasting model.

Moreover, the memory 720 further stores an instruction for executing the following processing: performing goodness-of-fit assessment on the generated capacity forecasting model; and if the assessment value obtained by the goodness-of-fit assessment is greater than a preset goodness-of-fit threshold, triggering a processing operation of forecasting the capacity at future time according to the capacity forecasting model.

According to the computer equipment provided by the present invention, the dynamical model is established for the acquired capacity time sequence, then the filter estimation is performed on the capacity time sequence under the dynamical model by using the Kalman filter to generate at least one state characteristic signal, the generated state characteristic signals are segmented, and the capacity at future time is forecasted according to the segmentation points, so that the forecasting accuracy is improved.

Further, the corresponding state transition matrix A and process noise variance matrix Q are extracted by taking the system state equation under the Jerk model as an example to implement Kalman filter estimation of the capacity time sequence; the capacity time sequence is segmented according to the high-order state characteristic signals obtained by the Kalman filter estimation, e.g. the velocity, the acceleration and the acceleration derivative; and finally, taking the last segmentation point as a starting point, the capacity time sequence thereafter is fitted to generate a capacity forecasting model, and the capacity at future time is forecasted. Therefore, the forecasting accuracy is improved.

The method and the device according to the present invention described above may be implemented in hardware or firmware, or implemented as software or computer codes which can be stored in a recording medium (e.g. CD, ROM, RAM, soft disk, hard disk or magneto-optical disk), or implemented as computer codes which are originally stored in a remote recording medium or a non-transient machine readable medium and can be downloaded through a network to be stored in a local recording medium, so that the method described herein can be processed by such software stored in the recording medium in a general purpose computer, a dedicated processor or programmable or dedicated hardware (e.g. ASIC or FPGA). It could be understood that the computer, the processor, the microprocessor controller or the programmable hardware include a storage assembly (e.g. RAM, ROM, flash memory, etc.) capable of storing or receiving software or computer codes, and when the software or computer codes are accessed and executed by the computer, the processor or the hardware, the processing method described herein is implemented. Moreover, when the general purpose computer accesses the codes for implementing the processing shown herein, the execution of the codes converts the general purpose computer to a dedicated computer for executing the processing illustrated herein.

The foregoing descriptions are merely specific embodiments of the present invention, but the protection scope of the present invention is not limited thereto. Any variation or substitution readily conceivable to those skilled in the art within the technical scope disclosed in the present invention shall fall within the protection scope of the present invention. Accordingly, the protection scope of the claims should prevail over the protection scope of the present invention.

What is claimed is:

1. A Kalman filter based computer data storage capacity forecasting method, comprising:
   acquiring a capacity time sequence of a computer data storage object to be forecasted;
   filtering the capacity time sequence by adopting a median filtering to generate a filtered capacity time sequence;
   establishing a dynamical model for the filtered capacity time sequence, and extracting a state transition parameter and a process noise parameter of the dynamical model;
   performing a Kalman filter estimation on the filtered capacity time sequence by using the state transition parameter and the process noise parameter to generate at least one state characteristic signal;
   segmenting the filtered capacity time sequence according to the at least one state characteristic signal, and determining at least one corresponding segmentation point;
   taking a last segmentation point in the filtered capacity time sequence as a starting point, linearly or nonlinearly fitting the data of the filtered capacity time sequence thereafter to generate a capacity forecasting model;
   forecasting the capacity of the computer data storage object at future time for capacity expansion according to the capacity forecasting model; and
   providing the forecasted capacity to a user to facilitate implementation of capacity expansion.

2. The method of claim 1, wherein the dynamical model comprises at least one of a constant velocity (CV) model, a constant acceleration (CA) model, a Singer model, a current statistical model and a Jerk model.

3. The method of claim 2, wherein the establishing the dynamical model for the filtered capacity time sequence, and extracting the state transition parameter and the process noise parameter of the dynamical model comprises:
   constructing a system state equation under the Jerk model for the filtered capacity time sequence, and extracting a state transition matrix A and a process noise variance matrix Q corresponding to the system state equation.

4. The method of claim 3, wherein the performing the Kalman filter estimation on the filtered capacity time sequence by using the state transition parameter and the process noise parameter to generate the at least one state characteristic signal comprises:
   performing the Kalman filter estimation on the filtered capacity time sequence by using the state transition matrix A and the process noise variance matrix Q, and generating at least one state characteristic signal of a velocity, an acceleration and an acceleration derivative.

5. The method of claim 4, wherein the segmenting the filtered capacity time sequence according to the at least one state characteristic signal, and determining at least one corresponding segmentation point comprises:
   segmenting the filtered capacity time sequence according to the at least one state characteristic signal of the velocity, the acceleration and the acceleration derivative obtained after the Kalman filter estimation on the filtered capacity time sequence, and determining the at least one corresponding segmentation point.

6. The method of claim 5, wherein the segmenting the filtered capacity time sequence according to the at least one state characteristic signal of the velocity, the acceleration and the acceleration derivative obtained after the Kalman filter estimation on the filtered capacity time sequence, and determining the at least one corresponding segmentation point comprises:
   determining at least one phase change signal area for at least one of the signals of the velocity, the acceleration and the acceleration derivative obtained after the Kalman filter estimation on the filtered capacity time sequence; and
   segmenting the filtered capacity time sequence according to the at least one determined phase change signal area, and determining the at least one corresponding segmentation point.

7. The method of claim 6, wherein the determining the at least one phase change signal area for the at least one of the signals of the velocity, the acceleration and the acceleration derivative obtained after the Kalman filter estimation on the filtered capacity time sequence comprises:
   calculating, for the at least one of the signals of the velocity, the acceleration and the acceleration derivative obtained after the Kalman filter estimation on the filtered capacity time sequence, variances or means of the signals of the velocity, the acceleration or the acceleration derivative within every two sliding windows according to the filtered capacity time sequence by adopting two continuous sliding windows with an identical length;
   marking an intermediate point between the two continuous sliding windows as a suspected segmentation point, if a probability that the variances or means of the signals of the velocity, the acceleration or the acceleration derivative within the two sliding windows are not identical is greater than a preset corresponding probability threshold; and
   determining a signal area constituted by a plurality of continuous suspected segmentation points as a phase change signal area of the filtered capacity time sequence.

8. The method of claim 7, wherein the segmenting the filtered capacity time sequence according to the at least one determined phase change signal area, and determining the at least one corresponding segmentation point comprises:
   determining, in each phase change signal area, the suspected segmentation point corresponding to a maximum of differences of the variances or the maximum of differences of the means of the signals of the velocity, the acceleration or the acceleration derivative within the two sliding windows as the segmentation point.

9. The method of claim 7, wherein the segmenting the filtered capacity time sequence according to the at least one determined phase change signal area, and determining the at least one corresponding segmentation point comprises:
   determining the intermediate point in each phase change signal area as the segmentation point.

10. The method of claim 1, further comprising:
    performing a goodness-of-fit assessment on the generated capacity forecasting model; and
    triggering a processing operation of forecasting the capacity at future time according to the capacity forecasting model, if an assessment value obtained by the goodness-of-fit assessment is greater than a preset goodness-of-fit threshold.

11. A Kalman filter based computer data storage capacity forecasting system, comprising:
at least one processor; and
a memory storing instructions, the instructions when executed by the at least one processor, cause the at least one processor to perform operations, the operations comprising:
acquiring a capacity time sequence of a computer data storage object to be forecasted;
filtering the capacity time sequence by adopting a median filtering to generate a filtered capacity time sequence;
establishing a dynamical model for the filtered capacity time sequence, and extracting a state transition parameter and a process noise parameter of the dynamical model;
performing a Kalman filter estimation on the filtered capacity time sequence by using the state transition parameter and the process noise parameter to generate at least one state characteristic signal;
segmenting the filtered capacity time sequence according to the at least one state characteristic signal, and determining at least one corresponding segmentation point;
taking a last segmentation point in the filtered capacity time sequence as a starting point, linearly or nonlinearly fitting the data of the filtered capacity time sequence thereafter to generate a capacity forecasting model;
forecasting the capacity of the computer data storage object at future time for capacity expansion according to the capacity forecasting model; and
providing the forecasted capacity to a user to facilitate implementation of capacity expansion.

12. The system of claim 11, wherein the dynamical model comprises at least one of a constant velocity (CV) model, a constant acceleration (CA) model, a Singer model, a current statistical model and a Jerk model.

13. The system of claim 12, wherein the establishing the dynamical model for the filtered capacity time sequence, and extracting the state transition parameter and the process noise parameter of the dynamical model comprises:
constructing a system state equation under the Jerk model for the filtered capacity time sequence, and extracting a state transition matrix A and a process noise variance matrix Q corresponding to the system state equation.

14. The system of claim 13, wherein the performing the Kalman filter estimation on the filtered capacity time sequence by using the state transition parameter and the process noise parameter to generate the at least one state characteristic signal comprises:
performing the Kalman filter estimation on the filtered_ capacity time sequence by using the state transition matrix A and the process noise variance matrix Q, and generating at least one state characteristic signal of a velocity, an acceleration and an acceleration derivative.

15. The system of claim 14, wherein the segmenting the filtered capacity time sequence according to the at least one state characteristic signal, and determining at least one corresponding segmentation point comprises:
segmenting the filtered capacity time sequence according to the at least one state characteristic signal of the velocity, the acceleration and the acceleration derivative obtained after the Kalman filter estimation on the filtered capacity time sequence, and determining the at least one corresponding segmentation point.

16. The system of claim 15, wherein the segmenting the filtered capacity time sequence according to the at least one state characteristic signal of the velocity, the acceleration and the acceleration derivative obtained after the Kalman filter estimation on the filtered capacity time sequence, and determining the at least one corresponding segmentation point comprises:
determining at least one phase change signal area for at least one of the signals of the velocity, the acceleration and the acceleration derivative obtained after the Kalman filter estimation on the filtered capacity time sequence; and
segmenting the filtered capacity time sequence according to the at least one determined phase change signal area, and determining the at least one corresponding segmentation point.

17. A computer equipment, comprising:
one or more processors;
a memory; and
one or more programs, which are stored in the memory and configured so that the one or more processors execute instructions contained in the one or more programs for executing a Kalman filter based computer data storage capacity forecasting method comprising:
acquiring a capacity time sequence of a computer data storage object to be forecasted;
filtering the capacity time sequence by adopting a median filtering to generate a filtered capacity time sequence;
establishing a dynamical model for the filtered capacity time sequence, and extracting a state transition parameter and a process noise parameter of the dynamical model;
performing a Kalman filter estimation on the filtered capacity time sequence by using the state transition parameter and the process noise parameter to generate the at least one state characteristic signal;
segmenting the filtered capacity time sequence according to the at least one state characteristic signal, and determining at least one corresponding segmentation point;
taking a last segmentation point in the filtered capacity time sequence as a starting point, linearly or nonlinearly fitting the data of the filtered capacity time sequence thereafter to generate a capacity forecasting model;
forecasting the capacity of the computer data storage object at future time for capacity expansion according to the capacity forecasting model; and
providing the forecasted capacity to a user to facilitate implementation of capacity expansion.

* * * * *